US008311078B2

(12) United States Patent
Hirama (10) Patent No.: US 8,311,078 B2
(45) Date of Patent: Nov. 13, 2012

(54) SIGNAL GENERATING APPARATUS, TRANSMISSION APPARATUS, SIGNAL GENERATING METHOD, TRANSMISSION METHOD, AND COMMUNICATION SYSTEM

(75) Inventor: Atsuhiro Hirama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/117,401

(22) Filed: May 27, 2011

(65) Prior Publication Data

US 2011/0228818 A1    Sep. 22, 2011

Related U.S. Application Data

(63) Continuation of application No. PCT/JP2008/073595, filed on Dec. 25, 2008.

(51) Int. Cl.
  *H04B 1/00*    (2006.01)
(52) U.S. Cl. ........................................ 375/146
(58) Field of Classification Search ............ 375/130, 375/141, 142, 144, 146, 147, 150, 224, 260, 375/295, 296, 308; 370/203, 208, 210, 342, 370/515, 516
  See application file for complete search history.

(56) References Cited

U.S. PATENT DOCUMENTS

| | | | | |
|---|---|---|---|---|
| 5,673,260 | A * | 9/1997 | Umeda et al. | 370/342 |
| 6,167,037 | A * | 12/2000 | Higuchi et al. | 370/335 |
| 6,449,302 | B2 | 9/2002 | Hunton | |
| 6,449,303 | B2 | 9/2002 | Hunton | |
| 6,590,906 | B1 | 7/2003 | Ishida et al. | |
| 7,003,017 | B2 | 2/2006 | Hunton | |
| 7,194,039 | B2 | 3/2007 | Hunton | |
| 7,852,956 | B2 | 12/2010 | Kawasaki | |
| 2004/0052314 | A1* | 3/2004 | Copeland | 375/296 |
| 2005/0226187 | A1* | 10/2005 | Minato | 370/335 |
| 2006/0215732 | A1* | 9/2006 | Chen et al. | 375/141 |
| 2007/0092017 | A1* | 4/2007 | Abedi | 375/260 |
| 2007/0098094 | A1* | 5/2007 | Yue et al. | 375/260 |
| 2007/0274201 | A1 | 11/2007 | Kawasaki | |
| 2008/0180311 | A1* | 7/2008 | Mikami et al. | 342/82 |

(Continued)

FOREIGN PATENT DOCUMENTS

EP          0 849 905        6/1998

(Continued)

OTHER PUBLICATIONS

International Search Report dated Feb. 3, 2009, from corresponding International Application No. PCT/JP2008/073595.

*Primary Examiner* — David C. Payne
*Assistant Examiner* — Syed Haider
(74) *Attorney, Agent, or Firm* — Katten Muchin Rosenman LLP (57) ABSTRACT

A signal generating apparatus includes a spreading device that respectively spreads data using spreading code that is based on an initial phase; a multiplexing unit that code multiplexes the data spread by the spreading device; a calculating unit that calculates a peak of a signal resulting from code multiplexing by the multiplexing unit; a changing unit that changes the initial phase of the spreading device in a predetermined order; a determining unit that each time the initial phase is changed by the changing unit, determines whether the peak calculated by the calculating unit is at most a threshold; and a transmission control unit that outputs the signal, if the determining unit determines that the peak is less than or equal to the threshold.

3 Claims, 10 Drawing Sheets

U.S. PATENT DOCUMENTS

2009/0097579 A1 * 4/2009 Yeon et al. .................... 375/260

FOREIGN PATENT DOCUMENTS

| | | |
|---|---|---|
| JP | 10-178413 | 6/1998 |
| JP | 2000-138645 | 5/2000 |
| JP | 2001-268050 | 9/2001 |
| JP | 2002-271296 | 9/2002 |
| JP | 2005-57582 | 3/2005 |
| JP | 2005-72959 | 3/2005 |
| JP | 3679018 | 5/2005 |
| JP | 2006-303552 | 11/2006 |
| JP | 2008-11508 | 1/2008 |
| WO | 01/82547 | 11/2001 |
| WO | 2004/019540 | 3/2004 |

* cited by examiner

SIGNAL GENERATING APPARATUS, TRANSMISSION APPARATUS, SIGNAL GENERATING METHOD, TRANSMISSION METHOD, AND COMMUNICATION SYSTEM

CROSS REFERENCE TO THE RELATED APPLICATIONS

This application is a continuation application of International Application PCT/JP2008/073595, filed Dec. 25, 2008, and designating the U.S., the entire contents of which are incorporated herein by reference.

FIELD

The embodiments discussed herein are related to a signal generating apparatus, a transmission apparatus, a signal generating method, a transmission method, and a communication system that code multiplex and generate transmission signals.

BACKGROUND

In radio communication systems transmitting transmission data by highly efficient frequency utilization, code division multiple access (CDMA) and orthogonal frequency division multiplexing access, schemes in which spreading code is used to multiplex code, are under active research.

Among radio communication systems are radio systems that continue to cyclically transmit from an aerial radio beacon system or from radio buoys, fixed data indicative of position and radio systems that transmit semi-fixed data indicative of temperature, etc. Among these systems, some are without an external power supply and are equipped with a battery as a main power source and a solar battery an auxiliary source.

In transmission apparatuses using a CDMA scheme or an OFDMA scheme, the peak to average power ratio (PAPR), a ratio of peak value to the average output of a code multiplexing processing unit per unit time, has gradually increased. Meanwhile, to amplify a transmission signal having a large PAPR, in the amplifier, a large backoff is set in backoff design from a 1-dB compression point and accordingly, power consumption in the amplifier also gradually increases.

On the other hand, to reduce the PAPR of a transmission signal, technology has been disclosed that staggers the phases of spreading codes according to subcarrier (see, for example, Japanese Laid-Open Patent Publication No. 2006-303552) as well as technology that induces different delay periods on transmission data groups that have been subjected to spread processing (see, for example, Japanese Laid-Open Patent Publication No. H10-178413). Further, technology has been disclosed that monitors the PAPR of a code-multiplexed transmission signal and controls the power of the transmission signal such that the PAPR becomes less than or equal to a prescribed value (see, for example, Japanese Laid-Open Patent Publication No. 2005-57582).

However, with the technology recited in Japanese Laid-Open Patent Publication No. 2006-303552, a problem arises in that when the same transmission data is code multiplexed, even if the PAPR can be reduced, when different transmission data is code multiplexed, the PAPR cannot always be reduced. In other words, depending on each combination of transmission data and spreading code, the PAPR of the transmission signal after code-multiplexing increases (see FIGS. 7 and 8). In particular, in CDMA and OFDMA, the PAPR increase is significant. Furthermore, since the phases of the spreading codes are merely adjusted, the PAPR of the code-multiplexed transmission signal cannot be changed greatly.

If the PAPR of the transmission signal becomes large and the power consumption of the amplifier increases, declines in the operation period of the apparatus and in product life will arise. Further, to cope with the PAPR of the transmission signal becoming large, a high performance amplifier is necessary, which increases cost. Even if a high performance amplifier is provided to cope with the PAPR of the transmission signal becoming large, a fixed bias corresponding to the large PAPR has to be set in the amplifier. Therefore, when the PAPR of the transmission signal is small, excess consumption current flows, resulting in wasteful power consumption.

With the technology recited in Japanese Laid-Open Patent Publication No. H10-178413 as well, depending on each combination of transmission data and delay period, the PAPR of the code-multiplexed transmission signal increases as does the power consumption of the amplifier. Further, since different delay periods are merely induced on the transmission data groups that have been subjected to spread processing, the PAPR of the code-multiplexed transmission signal cannot be changed greatly.

With the technology recited in Japanese Laid-Open Patent Publication No. 2005-57582, a problem arises in that since the power of the code-multiplexed transmission signal is controlled such that the PAPR becomes less than or equal to a prescribed value, the degree by which the power of the transmission signal is controlled varies, whereby the transmission signal degrades.

SUMMARY

According to an aspect of an embodiment, a signal generating apparatus includes a spreading device that respectively spreads data using spreading code that is based on an initial phase; a multiplexing unit that code multiplexes the data spread by the spreading device; a calculating unit that calculates a peak of a signal resulting from code multiplexing by the multiplexing unit; a changing unit that changes the initial phase of the spreading device in a predetermined order; a determining unit that each time the initial phase is changed by the changing unit, determines whether the peak calculated by the calculating unit is at most a threshold; and a transmission control unit that outputs the signal, if the determining unit determines that the peak is less than or equal to the threshold.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to the accompanying drawings. A signal generating apparatus, a transmission apparatus, a signal generating method, a transmission method, and a communication system according to the embodiments reduce amplifier power consumption by monitoring the PAPR of code-multiplexed data while changing the initial phase of each spreading code and amplifying, by an amplifier, the data that has been code multiplexed using the initial phase when the PAPR becomes less than or equal to a threshold, to thereby reduce power consumption of the amplifier. The PAPR of code-multiplexed data is monitored while the initial phase of each spreading code is changed and by the amplification of the code-multiplexed data by the amplifier, at the initial phase when the PAPR becomes less than or equal to the threshold, power consumption by the amplifier is reduced. Each function of the disclosed technology is, for example, implemented in and realized by a digital signal processor (DSP).

Figure 1:
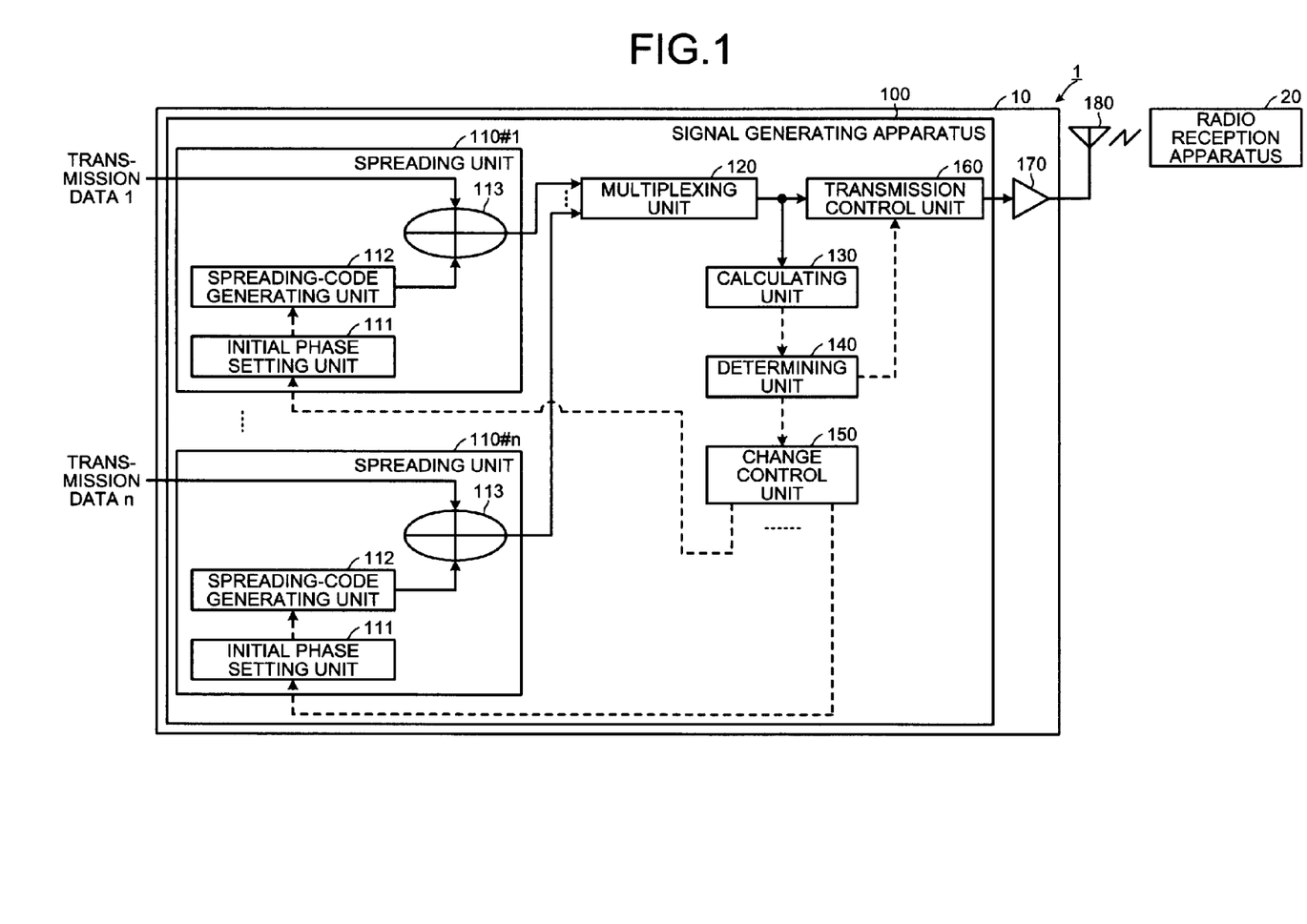
FIG. 1 is a block diagram of a functional configuration of a radio transmission apparatus and a radio communication system according to a first embodiment.

FIG. 1 is a block diagram of a functional configuration of a radio transmission apparatus and a radio communication system according to a first embodiment. In FIG. 1, solid lined arrows represent the flow of transmission data, transmission signals, and spreading code; and dotted lined arrows represent the flow of control signals. As depicted in FIG. 1, a radio communication system 1 includes a radio transmission apparatus 10 and a radio reception apparatus 20.

The radio transmission apparatus 10 transmits a signal to the radio reception apparatus 20. The radio transmission apparatus 10 includes a signal generating apparatus 100, an amplifier 170, and an antenna 180. The signal generating apparatus 100 includes spreading units 110#1-110#n, a multiplexing unit 120, a calculating unit 130, a determining unit 140, a change control unit 150, and a transmission control unit 160.

The spreading units 110#1-110#n respectively receive input of transmission data 1-n. The spreading units 110#1-110#n constitute a spreading device, spreading each of the transmission data 1-n by spreading code that is based on initial phase. Each of the spreading units 110#1-110#n includes an initial phase setting unit 111, a spreading-code generating unit 112, and a spread processing unit 113. Herein, description is given with respect to a spreading unit 110#1.

The initial phase setting unit 111 outputs to the spreading-code generating unit 112, a value indicating the initial phase and thereby sets the initial phase for generation of the spreading code by the spreading-code generating unit 112. The initial phase setting unit 111 also changes the value output to the spreading-code generating unit 112, under the control of the change control unit 150. The spreading-code generating unit 112 uses the value output from the initial phase setting unit 111 as the initial phase, generates spreading code, and outputs the generated spreading code to the spread processing unit 113. An example of the spreading-code generating unit 112 is described hereinafter (see FIGS. 2 and 5).

The spread processing unit 113, using the spreading code output from the spreading-code generating unit 112, performs spread processing on the input transmission data 1 and outputs the processed transmission data 1 to the multiplexing unit 120. The spread processing unit 113 calculates the exclusive OR of the transmission data 1 and the spreading code, and outputs the calculated exclusive OR to the multiplexing unit 120. Similarly, the spreading units 110#2-110#n respectively perform spread processing on the transmission data 2-n and output the processed transmission data 2-n to the multiplexing unit 120.

The multiplexing unit 120 is a multiplexing unit that code multiplexes the transmission data 1-n processed by the spreading units 110#1-110#n. The multiplexing unit 120 sums the transmission data 1-n output from the spreading units 110#1-110#n. The multiplexing unit 120 outputs the transmission signal obtained by the summation, to the calculating unit 130 and the transmission control unit 160.

The calculating unit 130 is a calculating unit that calculates the peak (crest factor, complementary cumulative distribution function (CCDF), etc.) of the transmission signal code-multiplexed by the multiplexing unit 120. The calculating unit 130, as a value relatively representing the peak of the transmission signal, calculates the PAPR, which is the ratio of peak value to the average power of the transmission signal, and outputs the calculated PAPR to the determining unit 140.

The determining unit 140, each time the initial phase of each of the spreading units 110#1-110#n is changed, compares the PAPR output from the calculating unit 130 and a predetermined threshold. The determining unit 140 further determines whether the PAPR is at most equivalent to the threshold (determining unit). The determining unit 140 outputs results of the determination to the change control unit 150 and the transmission control unit 160, respectively.

The change control unit 150 is a changing unit that changes the initial phase of each of the spreading units 110#1-110#n in a predetermined sequence. The change control unit 150, by controlling the initial phase setting unit 111 of each of the spreading units 110#1-110#n, changes the value that the initial phase setting units 111 output to the spreading-code generating units 112, respectively.

Further, the change control unit 150 performs control to change the initial phase until the determining unit 140 outputs a determination result indicating that the PAPR is less than or equal to the threshold. Changing of the initial phase in a predetermined sequence is changing the initial phase according to a predetermined rule. A predetermined rule is, for example, a rule to successively increase or decrease the initial phase by a given unit amount or a rule to change the initial phase to an initial phase determined by a given random number.

Further, the change control unit 150 performs control to change the initial phase for a predetermined number of times, as a limit. In this case, if the determining unit 140 does not output a determination result indicating that the PAPR has become less than or equal to the threshold despite the change control unit 150 performing control to change the initial phase for the predetermined number of times, the change control unit 150 stops performing control to change the initial phase.

The transmission control unit 160 is a transmission control unit that if the determining unit 140 determines that the PAPR has become less than or equal to the threshold, outputs the transmission signal code-multiplexed by the multiplexing unit 120. The transmission control unit 160 stores the transmission signal output from the multiplexing unit 120 to memory (not depicted) and when the determining unit 140 outputs a determination result indicating that the PAPR has become less than or equal to the threshold, the transmission control unit 160 outputs the stored transmission signal to the amplifier 170.

Further, if the determining unit 140 does not output a determination result indicating that the PAPR has become less than or equal to the threshold despite the change control unit 150 performing control to change the initial phase for the predetermined number of times, the transmission control unit 160 discards the transmission signal stored in the memory. By, for example, notification from the change control unit 150, the transmission control unit 160 is able to recognize the number of times that the change control unit 150 has changed the initial phase.

The amplifier 170 is an amplifying unit that amplifies the transmission signal output from the transmission control unit 160. The amplifier 170 outputs the amplified transmission signal to the antenna 180. The antenna 180 is a transmission unit that transmits the transmission signal output from the amplifier 170. The radio reception apparatus 20 receives the transmission signal transmitted by the antenna 180.

Since the initial phase of the spreading code is determined on the radio transmission apparatus 10 side, the radio reception apparatus 20 may use a sliding correlator to calculate the correlation function with the spreading code used at the radio transmission apparatus 10. Therefore, the radio transmission apparatus 10 is particularly effective when strict real-timeliness is not demanded at the receiving side. Further, the radio transmission apparatus 10 may interpolate pilot signals (synch words) in advance for the transmission data 1-$n$ input to the spreading units 110#1-110#$n$ in order to detect the head of the transmission signal at the receiving side. In this case, the radio reception apparatus 20 extracts a pilot signal from the received signal and detects synchronization.

Although a configuration has been described where the change control unit 150 controls the initial phase setting unit 111 of each of the spreading units 110#1-110#$n$, configuration is not limited hereto. In other words, configuration may be such that the change control unit 150 controls the initial phase setting unit 111 of at least any one among the spreading units 110#1-110#$n$, whereby each combination of transmission data and spreading code changes, thereby enabling the PAPR of the transmission signal to be changed.

Further, although a configuration has been described where the initial phase setting units 111 and the spreading-code generating units 112 are provided corresponding to each of the transmission data 1-$n$, configuration is not limited hereto. For example, configuration may be such that a common initial phase setting unit 111 and spreading-code generating unit 112 are provided for the transmission data 1-$n$. In this case, the change control unit 150 performs control to change the initial phase of each of the spreading codes for the transmission data 1-$n$ by time-sharing processing.

Figure 2:
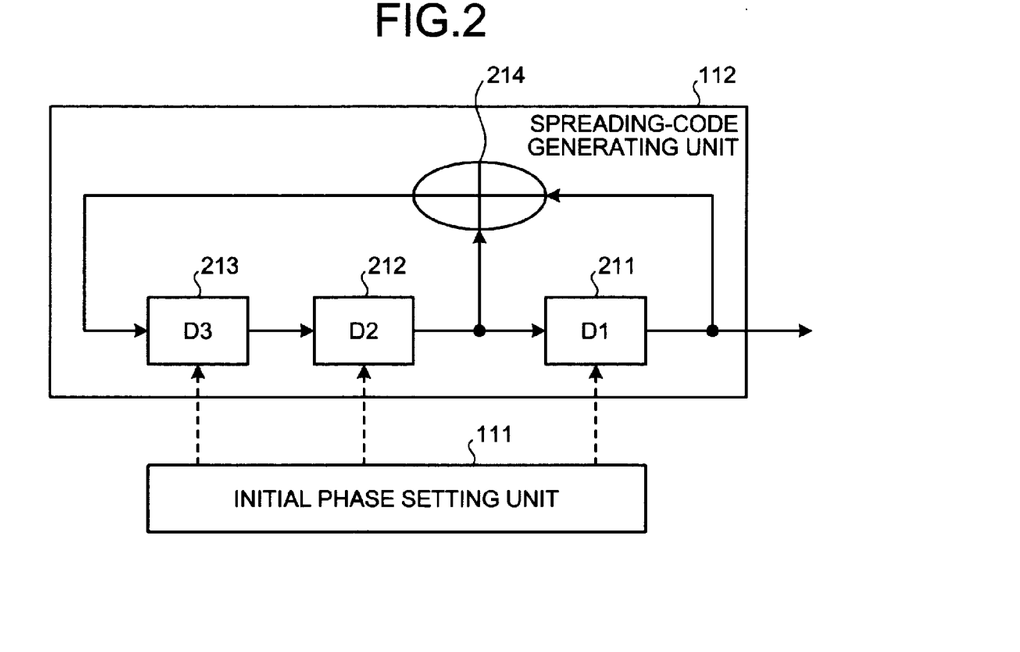
FIG. 2 is a block diagram of a first example of a spreading-code generating unit depicted in FIG. 1.

FIG. 2 is a block diagram of a first example of the spreading-code generating unit depicted in FIG. 1. In the first example, a configuration where the spreading-code generating unit 112 (refer to FIG. 1) is a 7-bit M-sequence encoding circuit (generation scheme: X3+X1+1) is described. As depicted in FIG. 2, the spreading-code generating unit 112 includes shift registers 211-213 (D1-D3) and an exclusive OR circuit 214.

The shift registers 211-213 are serially connected in the order of shifter registers 213, 212, 211. The exclusive OR circuit 214 calculates the exclusive OR of the value of the last shift register 211 and the value of the intermediate shift register 212 and feeds back to the first shift register 213, the calculation result.

The output of the shift register 211 is input to the spread processing unit 113 (refer to FIG. 1) and to the exclusive OR circuit 214. The output of the shift register 212 is input to the shift register 211 and to the exclusive OR circuit 214. The output of the shift register 213 is input to the shift register 212. The output of the exclusive OR circuit 214 is input to the shift register 213.

The initial phase setting unit 111 outputs respectively to the shift registers 211-213, values indicating the initial phase. By such a configuration, at each clock operation, the spreading-code generating unit 112 inputs to the spread processing unit 113, the output of the shift register 211, as spreading code. Here, since the 3-step shift registers 211-213 are used, the length of the spreading code output from the spreading-code generating unit 112 is $2^3-1=7$ bits.

Figure 3:
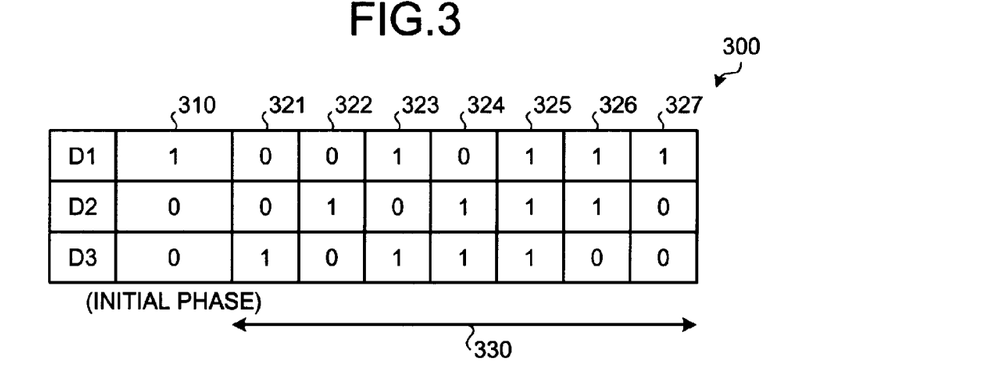
FIG. 3 depicts initial phases and output at the spreading-code generating unit depicted in FIG. 2.

FIG. 3 depicts initial phases and output at the spreading-code generating unit depicted in FIG. 2. Table 300 depicts changes in output of the shift registers 211-213 (D1-D3). Here, as depicted by reference numeral 310, a case will be described where the initial phases of the shift registers 211-213 has been respectively set to 1, 0, and 0 by the initial phase setting unit 111.

As depicted by reference numeral 321, the spreading-code generating unit 112, upon 1 clock operation, makes the output of the shift registers 211-213 to be 0, 0, and 1, respectively. As depicted by reference numeral 322, upon another 1-clock operation, the spreading-code generating unit 112 makes the output of the shift registers 211-213 0, 1, and 0, respectively. Thereafter, at each 1-clock operation, the spreading-code generating unit 112 changes the output of the shift registers 211-213, as depicted by reference numerals 323-327.

From the state depicted by reference numeral 327, the spreading-code generating unit 112, upon another 1-clock operation, returns the state to that depicted by reference numeral 321. In this manner, the output of the shift registers 211-213 repeatedly changes according to a cycle 330, which is 1 cycle of the states depicted by reference numerals 321-327. Therefore, the cycle of the spreading code output to the spread processing unit 113 is also the cycle 330.

Figure 4:
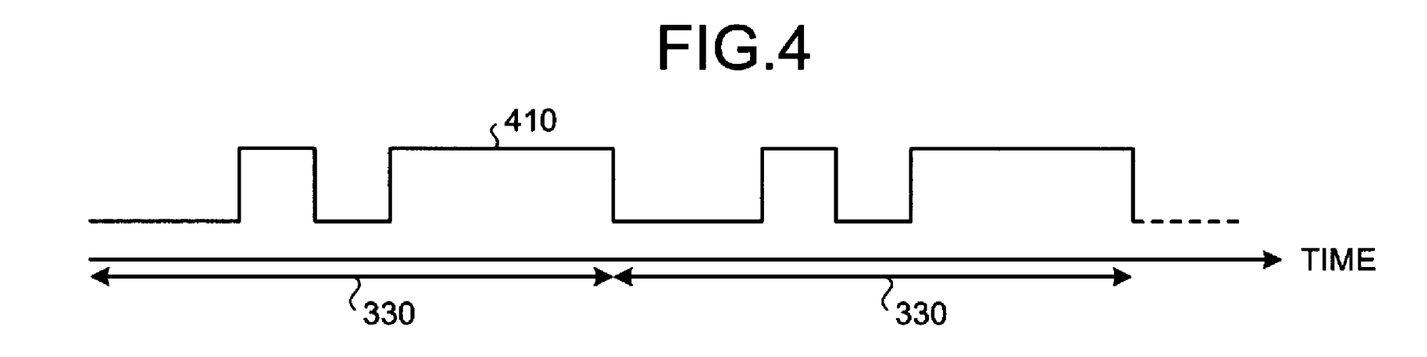
FIG. 4 is one example of output wave formation for the spreading-code generating unit depicted in FIG. 2.

FIG. 4 is one example of output wave formation for the spreading-code generating unit depicted in FIG. 2. In FIG. 4, parts similar to those depicted in FIG. 3 are assigned the same reference numerals and description thereof is omitted. In FIG. 4, the horizontal axis represents time. As described above, the spreading code output from the spreading-code generating unit 112 to the spread processing unit 113 is the output from the shift register 211.

As a result, the spreading code is a repetition of 0, 0, 1, 0, 1, 1, 1 (refer to reference numerals 321-327 in table 300). Waveform 410 represents the waveform of the spreading code output from the spreading-code generating unit 112 to the spread processing unit 113. As depicted by the waveform 410, the spreading code output from the spreading-code generating unit 112 has a waveform that repeats according to the cycle 330 (refer to FIG. 3).

Figure 5:
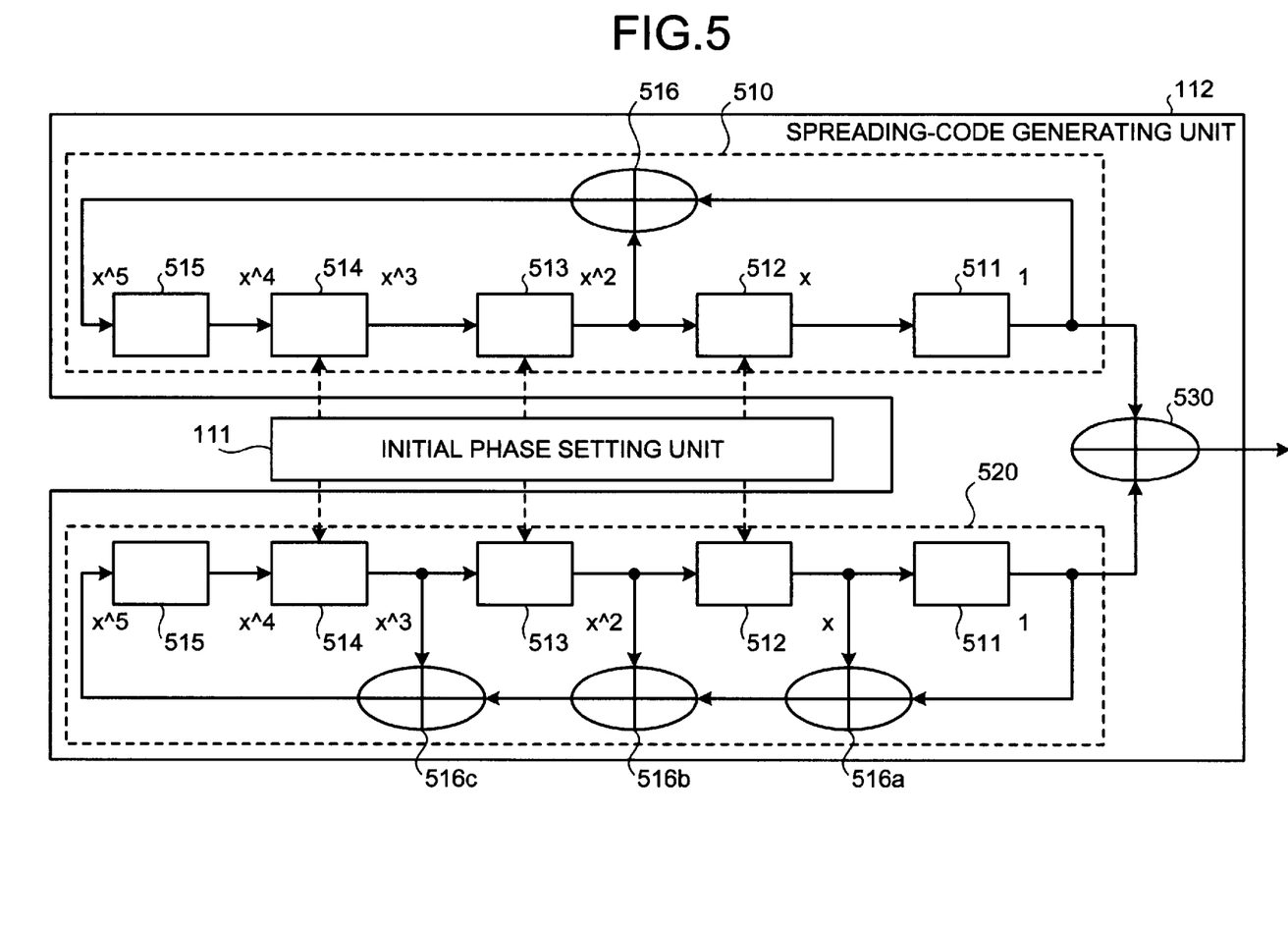
FIG. 5 is a block diagram of a second example of the spreading-code generating unit depicted in FIG. 1.

FIG. 5 is a block diagram of a second example of the spreading-code generating unit depicted in FIG. 1. In the second example, a configuration where the spreading-code generating unit 112 (refer to FIG. 1) is a Gold code generating circuit is described. The Gold code generating circuit is configured by computing the exclusive OR of the output of two M-sequence code generating circuits, having the same cycle. The spreading-code generating unit 112, as depicted in FIG.

5, includes a first M-sequence code generating unit 510, a second M-sequence code generating unit 520, and an exclusive OR circuit 530.

The first M-sequence code generating unit 510 includes shift registers 511-515 that are serially connected and an exclusive OR circuit 516. The exclusive OR circuit 516 calculates the exclusive OR of the value of the last shift register 511 and the value of the intermediate shift register 513 and feeds back to the first shift register 515, the calculation result.

The output of the shift register 511 is input to the exclusive OR circuit 530 and the exclusive OR circuit 516. The output of the shift register 512 is input to the shift register 511. The output of the shift register 513 is input to the shift register 512 and the exclusive OR circuit 516. The output of the shift register 514 is input to the shift register 513.

The output of the shift register 515 is input to the shift register 514. The output of the exclusive OR circuit 516 is input to the shift register 515. The second M-sequence code generating unit 520 differs from the first M-sequence code generating unit 510 in that in place of the exclusive OR circuit 516, the second M-sequence code generating unit 520 has plural exclusive OR circuits 516a-516c. Further, the second M-sequence code generating unit 520 may have a configuration identical to that of the first M-sequence code generating unit 510. The values output from the initial phase setting unit 111 are set as the initial phases of the shift registers 512-514 of the first M-sequence code generating unit 510 and of the second M-sequence code generating unit 520, respectively.

The exclusive OR circuit 530 calculates the exclusive OR of the output of the respective shift registers 511 of the first M-sequence code generating unit 510 and of the second M-sequence code generating unit 520 and outputs the calculation result to the spread processing unit 113 as spreading code (refer to FIG. 1). By such a configuration, at each clock operation, the spreading-code generating unit 112 inputs the output of the exclusive OR circuit 530 to the spread processing unit 113 as spreading code.

In FIGS. 2 and 5, although cases have been described where the code scheme of the spreading code generated by the spreading-code generating unit 112 is 7-bit M-sequence code and Gold code, respectively, the code scheme of the spreading code generated by the spreading-code generating unit 112 is not limited hereto. For example, orthogonal codes such as Walsh code and orthogonal Gold code as well as orthogonal variable spreading factor code, etc. can be used for the code scheme of the spreading code generated by the spreading-code generating unit 112.

Figure 6:
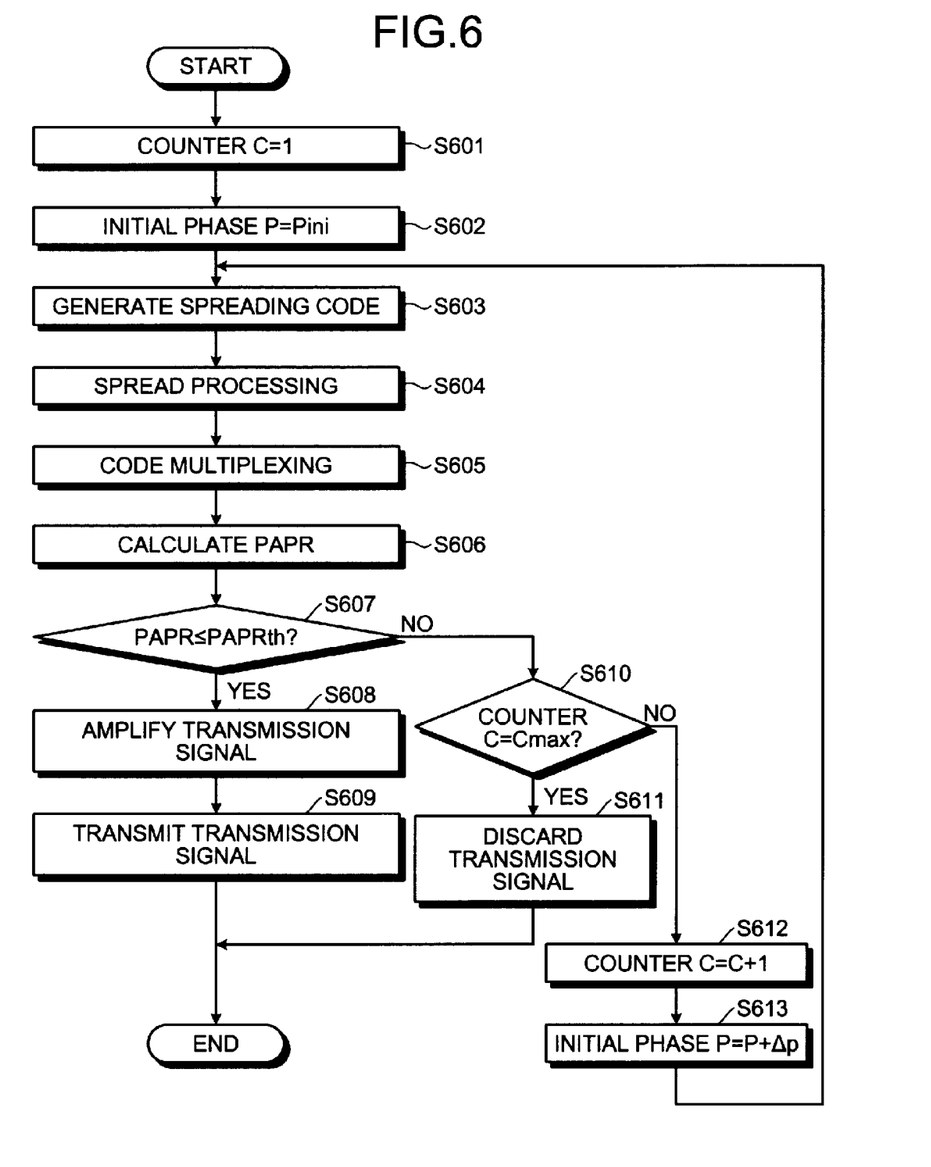
FIG. 6 is a flowchart of one example of operation of the radio transmission apparatus depicted in FIG. 1.

FIG. 6 is a flowchart of one example of operation of the radio transmission apparatus depicted in FIG. 1. The change control unit 150 initializes a counter C for the number of loops (C=1) (step S601). Next, the initial phase setting units 111 of the spreading units 110#1-110#*n*, under the control of the change control unit 150, sets the initial phase P set in the spreading-code generating units 112 to be an initial phase Pini (default value of initial phase) (step S602).

The spreading-code generating units 112 of the spreading units 110#1-110#*n* generate spreading code based on the initial phase set at the step executed most recently among step S602 and step S613 (step S603). The spread processing units 113 of the spreading units 110#1-110#*n* use the spreading code generated at step S603 and perform spread processing with respect to the transmission data 1-*n*, respectively (step S604).

The multiplexing unit 120 code multiplexes the transmission data 1-*n* subjected to spread processing at step S604 (step S605). The calculating unit 130 calculates the PAPR of the transmission signal code multiplexed at step S605 (step S606). The determining unit 140 determines whether the PAPR calculated at step S606 is at most a predetermined threshold PAPRth (step S607).

If the PAPR is less than or equal to the threshold PAPRth (step S607: YES), the transmission control unit 160 outputs the transmission signal code multiplexed at step S605 to the amplifier 170. The amplifier 170 amplifies the transmission signal output by the transmission control unit 160 (step S608). Next, the antenna 180 transmits to the radio reception apparatus, the transmission signal amplified at step S608 (step S609), ending a series of processes.

At step S607, if the PAPR is not less than or equal to the threshold PAPRth (step S607: NO), the change control unit 150 determines whether the counter C has reached a predetermined maximum count Cmax (step S610). If the counter C has reached the maximum count Cmax (step S610: YES), the transmission control unit 160 discards the transmission signal code multiplexed at step S605 (step S611), ending the series of processes.

At step S610, if the counter C has not reached the maximum count Cmax (step S610: NO), the change control unit 150 increments the counter C (C=C+1) (step S612). Next, the initial phase setting units 111, under the control of the change control unit 150, increase the initial phase p of the spreading-code generating units 112 by a unit amount $\Delta p$ (P=P+$\Delta p$) (step S613); the flow returns to step S603 and the processing continues.

Each time at least a portion of the transmission data input to the spreading units 110#1-110#*n* changes, the steps above are performed. Further, the above steps are performed when phase relations of the transmission data input to the spreading units 110#1-110#*n* has changed. If the transmission signal has been discarded at step S611, the same transmission data may be again input to the spreading units 110#1-110#*n* and reprocessed by the steps above.

Further, at step S602, the initial phase P of each of the spreading-code generating units 112 may be set to a random initial value. Moreover, step S602 may be excluded and the initial phase set by the previous execution of the steps may be used as is. At step S613, the initial phase P may be decreased by a unit amount $\Delta p$ (P=P−$\Delta p$).

Figure 7:
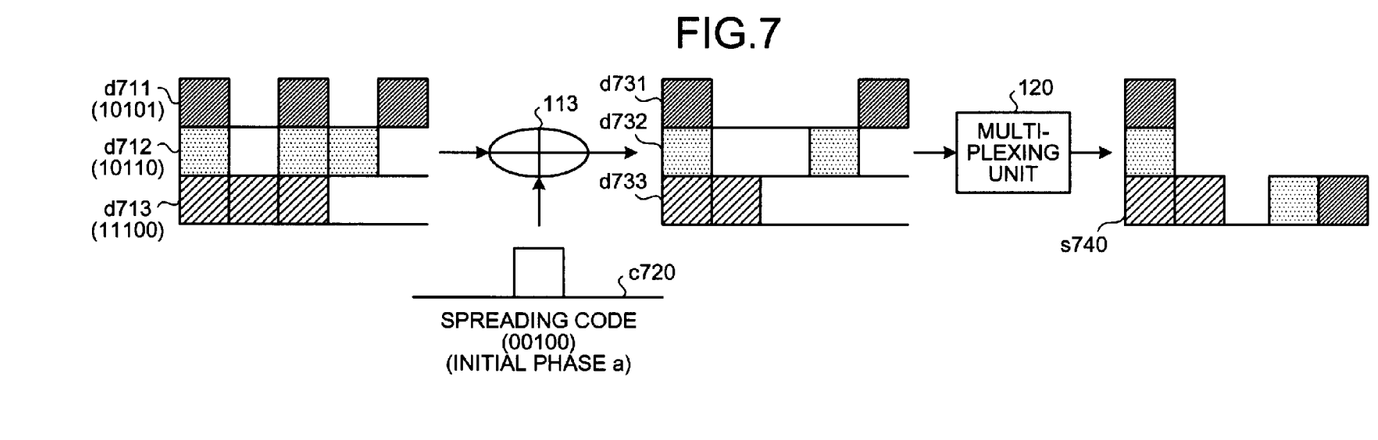
FIG. 7 is a diagram of the relationship between initial phase and PAPR (part 1).

FIG. 7 is a diagram of the relationship between initial phase and PAPR (part 1). FIG. 7 depicts a simulation of the transmission data and the transmission signal at each portion of the signal generating apparatus 100. In the description hereinafter, the value of the transmission data is indicated in parentheses. Here, the transmission data to be code multiplexed is transmission data d711 (10101), transmission data d712 (10110), and transmission data d713 (11100).

The transmission data d711-d713 are respectively input to the spreading units 110#1-110#3 (n=3). Further, as a result of the initial phase_a set by the initial phase setting unit 111, spreading codec 720 (00100) is assumed to be generated by the spreading-code generating unit 112. Transmission data d731 is transmission data (10001) resulting from spread processing of the transmission data d711 at the spread processing unit 113 of the spreading unit 110#1, using the spreading codec 720.

Transmission data d732 is transmission data (10010) resulting from spread processing of the transmission data d712 at the spread processing unit 113 of the spreading unit 110#2, using the spreading codec 720. Transmission data d733 is transmission data (11000) resulting from spread processing of the transmission data d713 at the spread processing unit 113 of the spreading unit 110#3, using the spreading codec 720.

Transmission signal s740 is transmission data resulting from code multiplexing of the transmission data d731-d733 at the multiplexing unit 120. The peak value of the transmission signal s740 is the largest value, "3", among the summation results (3, 1, 0, 1, 1) for the transmission data d731-d733. The average value of the transmission signal s740 is the average of the summation results (3, 1, 0, 1, 1) for the transmission data d731-d733, "1.2". Accordingly, the PAPR of the transmission signal s740 is "3/1.2=2.5".

If the predetermined threshold PAPRth is assumed to be "2", the PAPR (2.5) of the transmission signal s740 is greater than the threshold PAPRth. Consequently, at step S607 depicted in FIG. 6, the flow transitions to step S610. In this manner, the PAPR of the transmission signal s740 becomes large consequent to the initial phase set by the initial phase setting unit 111.

Figure 8:
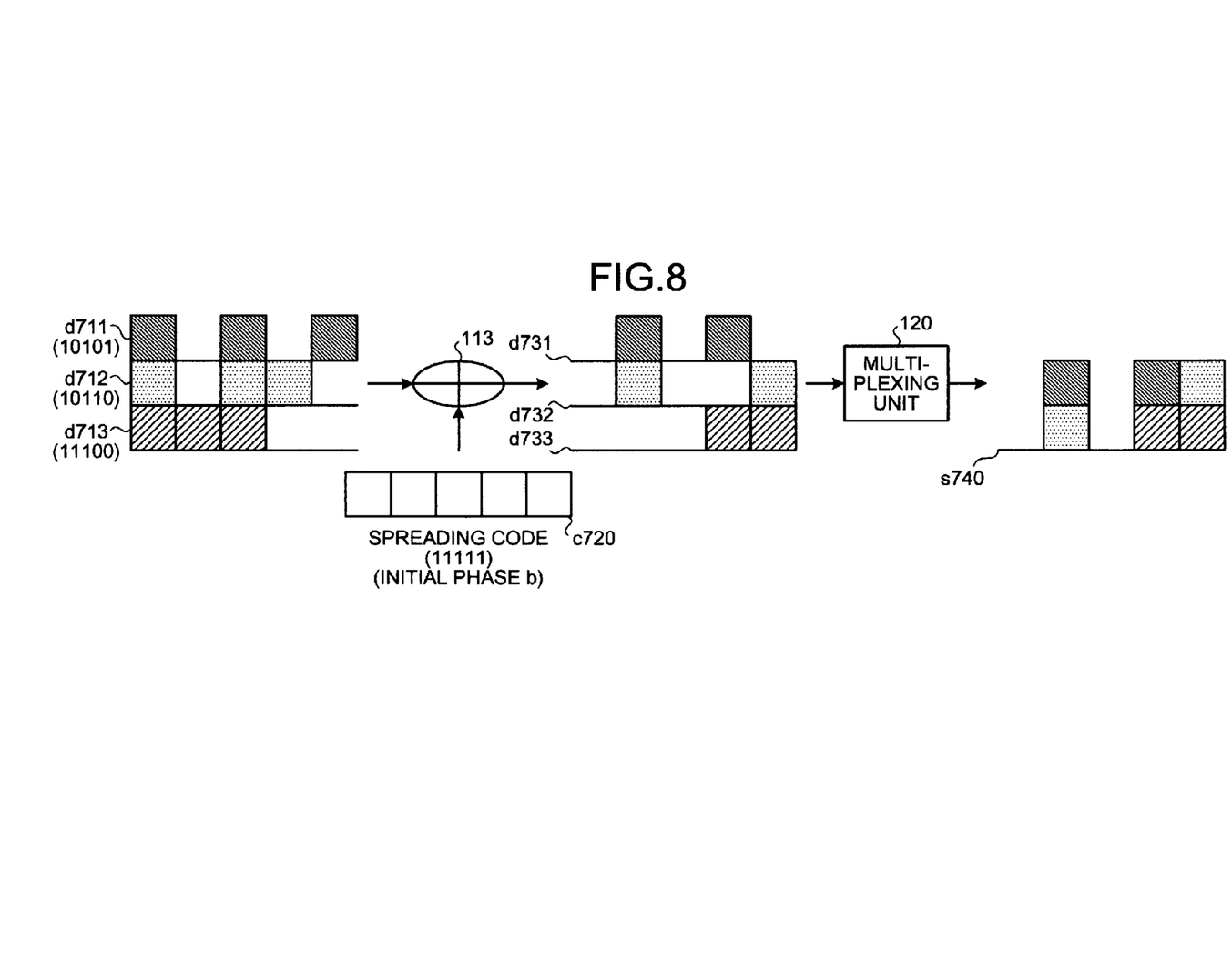
FIG. 8 is a diagram of the relationship between initial phase and PAPR (part 2).

FIG. 8 is a diagram of the relationship between initial phase and PAPR (part 2). In FIG. 8, portions identical to those depicted in FIG. 7 are given the same reference numerals used in FIG. 7 and description thereof is omitted. Here, as a result of the initial phase_b (≠a) set by the initial phase setting unit 111, the spreading codec 720 (11111) is assumed to be generated by the spreading-code generating unit 112.

In this example, the value of the transmission data d731 is (01010); the value of the transmission data d732 is (01001); and the value of the transmission data d733 (00011). Accordingly, the summation results for the transmission data d731-d733 are (0, 2, 0, 2, 2). The peak value of the transmission signal s740 is the largest value, "2", among the summation results (0, 2, 0, 2, 2) for the transmission data d731-d733.

The average value of the transmission signal s740 is the average of the summation results (0, 2, 0, 2, 2) for the transmission data d731-d733, "1.2". Accordingly, the PAPR of the transmission signal s740 is "2/1.2=1.66 . . . ". If the predetermined threshold PAPRth is assumed to be "2" (identical to the description of FIG. 7), the PAPR (1.66) of the transmission signal s740 is less than or equal to the threshold PAPRth. As a result, at step S607 depicted in FIG. 6, the flow transitions to step S608.

As depicted in FIGS. 7 and 8, consequent to the changing of the initial phase by the change control unit 150, even if the average value of the transmission signal s740 is the same, the PAPR of the transmission signal s740 varies. Within the limit of the predetermined maximum count, the change control unit 150 performs control to change the initial phase until the PAPR of the transmission signal s740 becomes less than or equal to the threshold PAPRth.

Thus, according to the signal generating apparatus 100 of the first embodiment, the initial phase is changed in a predetermined order while the PAPR of a code-multiplexed transmission signal is monitored. As a result, irrespective of the combination of transmission data and spreading code, an initial phase can be appropriately determined that causes the PAPR of the code-multiplexed transmission signal to become less than or equal to a threshold. Consequently, increases of the PAPR of the transmission signal can be suppressed and power consumption by the amplifier 170 reduced.

Further, since the initial phase is changed in a predetermined order, an appropriate initial phase can be determined by simple change control. Moreover, the PAPR of the transmission signal is adjusted by changing the initial phase of the spreading code, whereby the PAPR of the transmission signal can be changed greatly compared to staggering the phase of the spreading code and/or the transmission data. As a result, power consumption by the amplifier 170 can be greatly reduced.

Since an increase of the PAPR of the transmission signal can be suppressed, even if the amplifier 170 disposed has low performance, high quality amplification of the transmission signal is possible. As a result, the quality of the transmission signal can be maintained while facilitating reductions in the cost of manufacturing the apparatus. Further, even if the amplifier 170 disposed has high performance, since the setting of a fixed bias can be performed according to a small PAPR, excess consumption current through the amplifier 170 can be reduced.

Furthermore, the changing of the initial phase is limited to a predetermined number of times and if despite changing the initial phase this number of times, the PAPR of the transmission signal has not been determined to be less than or equal to the threshold, the transmission signal is discarded. As a result, after the transmission data have been input, the period that elapses until a transmission signal is transmitted becomes extremely long, enabling the occurrence of disruptions in communication to be prevented.

Although a configuration has been described where, limited to a predetermined number of times, the change control unit 150 changes the initial phase, control for changing the initial phase is not limited hereto. For example, the change control unit 150 may perform control to change the initial phase within a predetermined period. A predetermined period is, for example, a period from the input of the transmission data into the signal generating apparatus 100 until the elapse of a given amount of time.

In this case, if a determination result indicating that the PAPR is less than or equal to the threshold has not been output from the determining unit 140 despite the elapse of the above predetermined period, the transmission control unit 160 discards the transmission signal held in the memory. As a result, the time from the input of the transmission data until the output of a transmission signal becomes extremely long, enabling the occurrence of disruptions in communication to be prevented.

Figure 9:
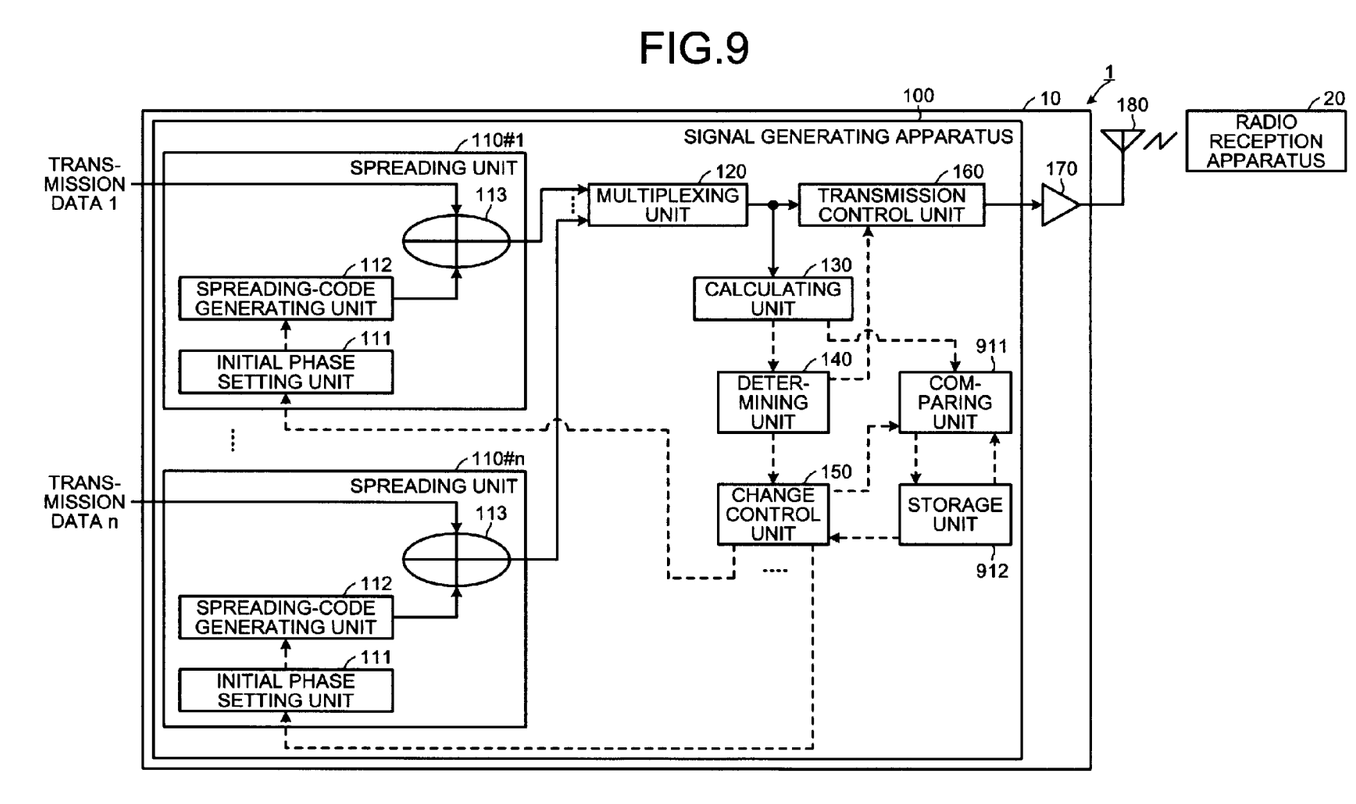
FIG. 9 is a block diagram of a functional configuration of the radio transmission apparatus and the radio communication system according to a second embodiment.

FIG. 9 is a block diagram of a functional configuration of the radio transmission apparatus and the radio communication system according to a second embodiment. In FIG. 9, solid lined arrows represent the flow of transmission data, transmission signals, and spreading code; and dotted lined arrows represent the flow of control signals. In FIG. 9, components identical to those depicted in FIG. 1 are given the same reference numerals used in FIG. 1 and description thereof is omitted. As depicted in FIG. 9, the signal generating apparatus 100 according to the second embodiment includes a comparing unit 911 and a storage unit 912 in addition to the configuration depicted in FIG. 1.

The calculating unit 130 outputs the calculated PAPR to the determining unit 140 and the comparing unit 911, respectively. Each time control is performed to change the initial phases of the spreading units 110#1-110#n, the change control unit 150 outputs the initial phases respectively set in the spreading units 110#1-110#n to the comparing unit 911. The initial phase when the PAPR calculated by the calculating unit 130 becomes smallest consequent to a changing of the initial phase by the change control unit 150 is stored by the comparing unit 911 and the storage unit 912.

The comparing unit 911 compares the PAPR output from the calculating unit 130 and the PAPR stored in the storage unit 912. If the PAPR output from the calculating unit 130 is less than or equal to the PAPR stored in the storage unit 912, the comparing unit 911 correlates and stores to the storage unit 912 by overwriting, the PAPR output from the calculating unit 130 and the initial phase output from the change control unit 150, whereby the smallest PAPR of the transmission signal and the initial phase when the PAPR of the transmission signal becomes smallest are stored to the storage unit 912.

If a determination result indicating that the PAPR is less than or equal to the threshold is not output from the determining unit 140 despite the change control unit 150 having performed control to change the initial phase the predetermined number of times, the change control unit 150 reads out the initial phases stored in the storage unit 912. The change control unit 150 controls each of the initial phase setting units 111 so that the initial phases of the spreading units 110#1-110#n become equivalent to the initial phases read out from the storage unit 912.

As a result of the change control unit 150 controlling the initial phase setting units 111 so that the initial phases become equivalent to the initial phases read out from the storage unit 912, the transmission control unit 160 outputs to the amplifier 170, the transmission signal output from the multiplexing unit 120. At this time, the calculation of the PAPR by the calculating unit 130 and the determination by the determining unit 140 need not be performed. As a result, the transmission signal for which the PAPR is smallest, is amplified by the amplifier 170 and output to the antenna 180.

Figure 10A:
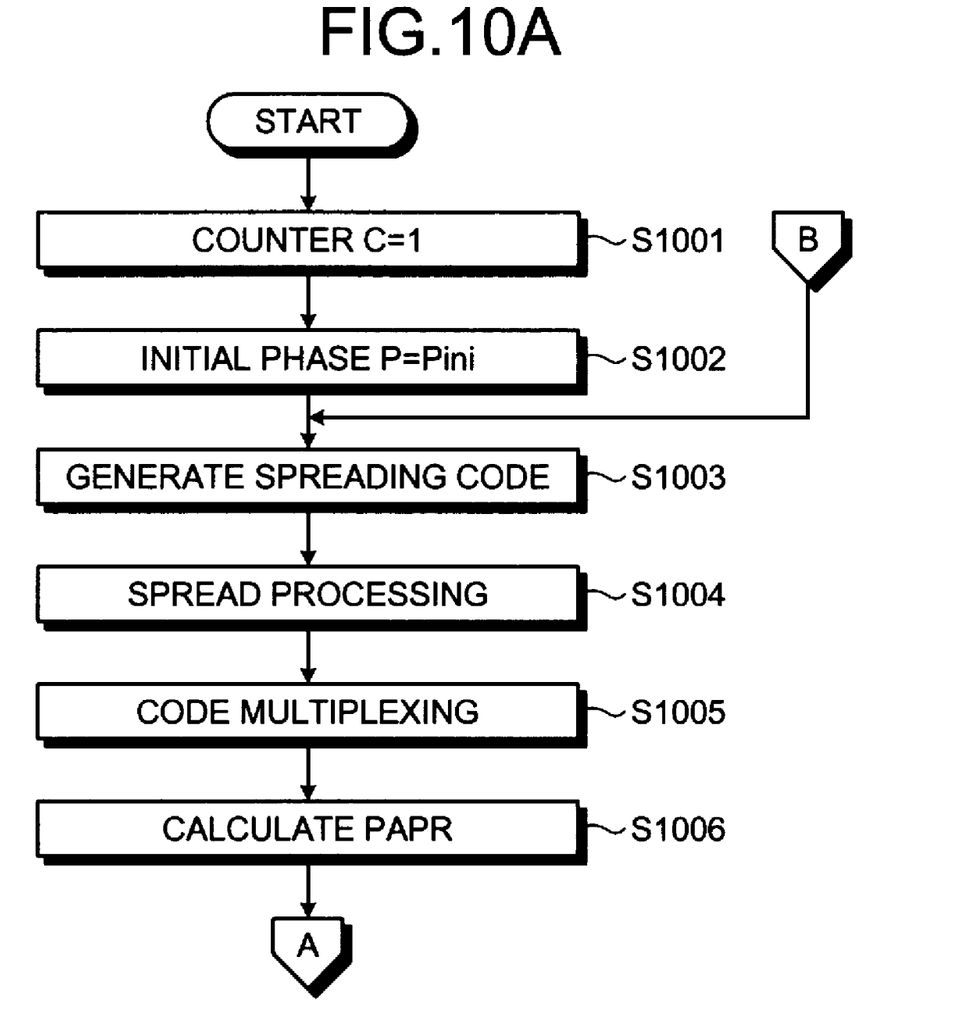
FIG. 10A is a flowchart of one example of the operation of the radio transmission apparatus depicted in FIG. 9 (part 1).
Figure 10B:
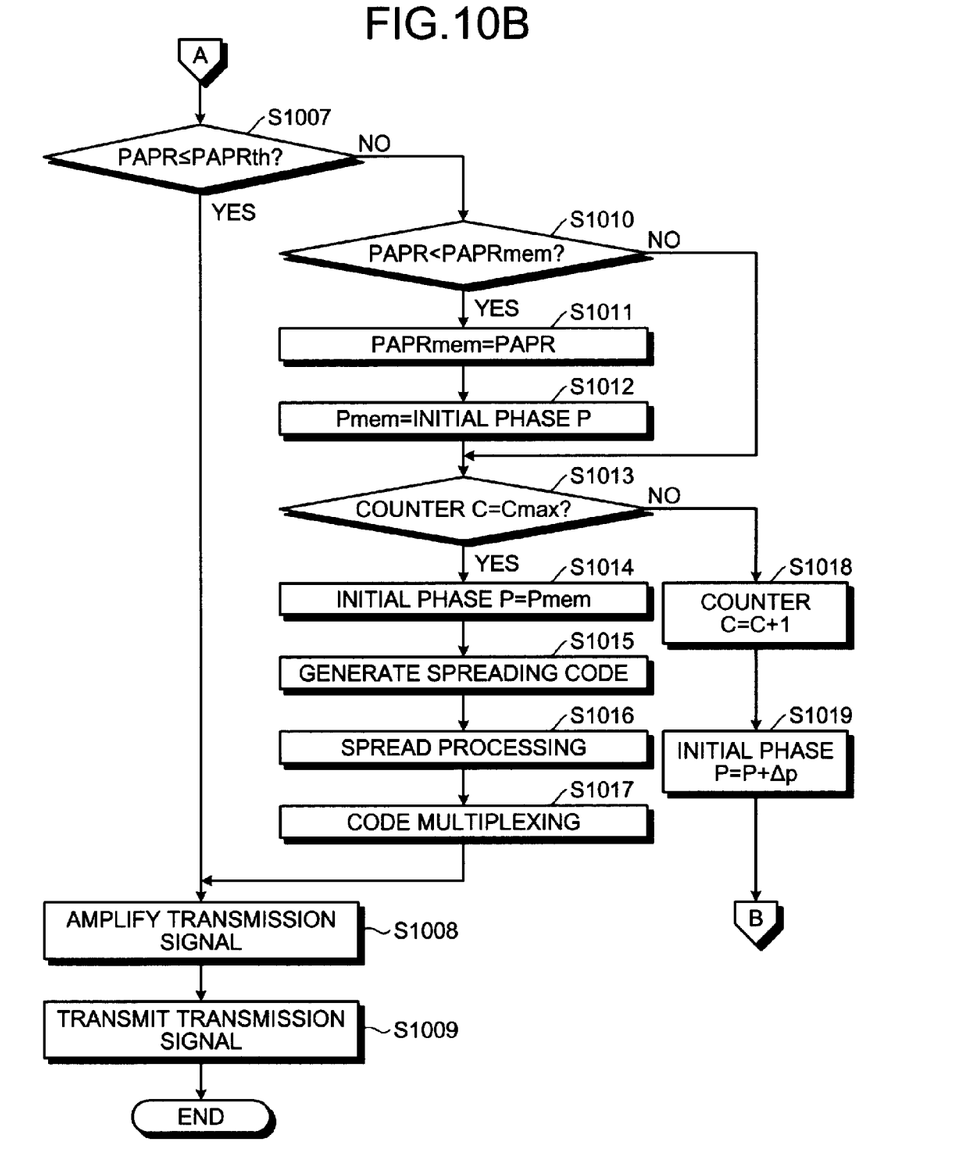
FIG. 10B is a flowchart of one example of the operation of the radio transmission apparatus depicted in FIG. 9 (part 2).

FIG. 10A is a flowchart of one example of the operation of the radio transmission apparatus depicted in FIG. 9 (part 1). FIG. 10B is a flowchart of one example of the operation of the radio transmission apparatus depicted in FIG. 9 (part 2). Step S1001-S1009 depicted in FIGS. 10A and 10B are identical to steps S601-S609 depicted in FIG. 6 and therefore, description thereof is omitted.

At step S1007 in FIG. 10B, if the PAPR is not less than or equal to the threshold PAPRth (step S1007: NO), the comparing unit 911 determines whether the PAPR calculated at step S1006 is less that the PAPRmem stored in the storage unit 912 (step S1010). In the first loop through step S1010, since the PAPRmem is not stored in the storage unit 912, the PAPR is assumed to be less than the PAPRmem.

At step S1010, if the PAPR calculated at step S1006 is not less than the PAPRmem stored in the storage unit 912 (step S1010: NO), the flow transitions to step S1013 and processing continues. In this case, the PAPRmem and the initial phase Pmem stored in the storage unit 91 are maintained without being overwritten.

At step S1010, if the PAPR calculated at step S1006 is less than the PAPRmem (step S1010: YES), the comparing unit 911 stores the PAPR to the storage unit 912, as a new PAPRmem (step S1011). Further, the comparing unit 911 stores to the storage unit 912, as the initial phase Pmem, the initial phase P set at the previous execution of step S1019 (step S1012).

Next, the change control unit 150 determines whether the counter C has reached the predetermined maximum count Cmax (step S1013). If the counter C has reach the maximum count Cmax (step S1013: YES), the change control unit 150 sets the initial phase P of each of the spreading-code generating units 112 to the initial phases Pmem stored to the storage unit 912 at step S1011 (initial phase P=Pmem) (step S1014).

Next, the spreading-code generating units 112, based on the initial phases set at step S1014, generate spreading code (step S1015). The spread processing units 113 use the spreading codes generated step S1015 to perform spread processing on the transmission data 1-n, respectively (step S1016).

The multiplexing unit 120 code multiplexes the transmission data 1-n subjected to spread processing at step S1016 (step S1017), whereby the flow transitions to step S1008 and processing continues. At step S1008, transmission control unit 160 outputs to the amplifier 170, the transmission signal code multiplexed at the step executed most recently among step S1005 and step S1017; and the output transmission signal is amplified by the amplifier 170.

At step S1013, if the counter C has not reached the maximum count Cmax (step S1013: NO), the flow transitions to step S1018 and processing continues. Step S1018 and step S1019 are identical to step S612 and step S613 depicted in FIG. 6, respectively and description thereof is omitted. After the execution of step S1019, the flow transitions to step S1003 depicted in FIG. 10A and processing continues (signal B).

Thus, according to the signal generating apparatus 100 of the second embodiment, if the PAPR of the transmission signal is not determined to be less than or equal to the threshold despite the initial phase being changed the predetermined number of times, the transmission signal is amplified by the initial phase causing the PAPR to be smallest. As a result, the effect according to the first embodiment is achieved and even if the PAPR is less than or equal to the threshold, distortion of the transmission signal at the amplifier 170 can be minimized and the transmission signal can be transmitted.

Although a configuration has been described where the PAPR and the initial phases are overwritten and stored to storage unit 912, whereby the smallest PAPR and the initial phase therefor alone are stored in the storage unit 912, configuration is not limited hereto. For example, configuration may be such that each time the initial phase is changed by the change control unit 150, the PAPR output from the calculating unit 130 and the initial phase output from the change control unit 150 are correlated and stored.

In this case, at step S1014 in FIG. 10B, the change control unit 150 selects the smallest PAPR from among the PAPRs stored in the storage unit 912. The change control unit 150 correlates the initial phase P of each of the spreading-code generating units 112 with the selected PAPR and sets the initial phases P to the initial phases stored in the storage unit 912.

As described, according to the disclosed signal generating apparatus, transmission apparatus, signal generating method, transmission method, and communication system, an increase of the peak of a code-multiplexed transmission signal can be suppressed and power consumption by the amplifier reduced. The signal generating apparatus 100 according to each of the embodiments is applicable to base stations in a radio communication system and transmitters such as radio buoys in addition to mobile terminals.

Further, within a predetermined limit, the signal generating apparatus 100 repeatedly performs control to change the initial phase until the PAPR becomes less than or equal to a threshold. Consequently, if the circuit performance of the signal generating apparatus 100 is low, the transmission data respectively input to the spreading units 110#1-110#n are preferably fixed data having values that do not change (for example, position data transmitted by a radio buoy) or semi-fixed data having values that change minimally (for example, rough temperature data).

According to the configuration above, by monitoring the peak of a code-multiplexed signal while changing the initial phase in a predetermined sequence, an initial phase causing the peak of the code-multiplexed signal to be less than or equal to a threshold can be appropriately determined.

According to the embodiments, peak increases of code-multiplexed transmission signals can be suppressed and amplifier power consumption can be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A signal generating apparatus comprising:
   a spreading device that respectively spreads data using spreading code that is based on an initial phase;
   a multiplexing unit that code multiplexes the data spread by the spreading device;
   a calculating unit that calculates a peak of a signal resulting from code multiplexing by the multiplexing unit;
   a changing unit that changes the initial phase of the spreading device in a predetermined order;
   a determining unit that each time the initial phase is changed by the changing unit, determines whether the peak calculated by the calculating unit is at most a threshold;
   a transmission control unit that outputs the signal, if the determining unit determines that the peak is less than or equal to the threshold; and
   a storage unit that stores an initial phase, which is the initial phase when the peak calculated by the calculating unit becomes smallest consequent to a changing of the initial phase by the changing unit,
   wherein the changing unit changes the initial phase of the spreading device to become equivalent to the initial phase stored in the storage unit, if the determining unit does not determine that the peak is less than or equal to the threshold despite the initial phase being changed the predetermined number of times, and
   wherein the transmission control unit transmits the signal as a result of the initial phase being changed to become equivalent to the initial phase stored in the storage unit.

2. A signal generating method comprising:
   spreading data respectively, using spreading code that is based on an initial phase;
   code multiplexing the data spread at the spreading;
   calculating a peak of a signal resulting from the code multiplexing;
   changing, in a predetermined order, the initial phase for the spreading;
   determining, each time the initial phase is changed at the changing, whether the peak calculated at the calculating is at most a threshold;
   performing transmission control to output the signal, if the peak is determined, at the determining, to be less than or equal to the threshold; and
   storing an initial phase, which is the initial phase when the peak calculated at the calculating becomes smallest consequent to a changing of the initial phase at the changing,
   wherein the initial phase is changed to become equivalent to the initial phase stored, if it is not determined that the peak is less than or equal to the threshold despite the initial phase being changed the predetermined number of times, and
   wherein the signal is transmitted as a result of the initial phase being changed to become equivalent to the initial phase stored.

3. A communication system comprising:
   a transmission apparatus that includes
      a spreading device that respectively spreads data using spreading code that is based on an initial phase,
      a multiplexing unit that code multiplexes the data spread by the spreading device,
      a calculating unit that calculates a peak of a signal resulting from code multiplexing by the multiplexing unit,
      a changing unit that changes the initial phase of the spreading device in a predetermined order,
      a determining unit that each time the initial phase is changed by the changing unit, determines whether the peak calculated by the calculating unit is at most a threshold,
      a transmission control unit that outputs the signal, if the determining unit determines that the peak is less than or equal to the threshold,
      an amplifying unit that amplifies the signal output from the transmission control unit,
      a transmission unit that transmits the signal amplified by the amplifying unit; and
      a storage unit that stores an initial phase, which is the initial phase when the peak calculated by the calculating unit becomes smallest consequent to a changing of the initial phase by the changing unit,
      wherein the changing unit changes the initial phase of the spreading device to become equivalent to the initial phase stored in the storage unit, if the determining unit does not determine that the peak is less than or equal to the threshold despite the initial phase being changed the predetermined number of times, and
      wherein the transmission control unit transmits the signal as a result of the initial phase being changed to become equivalent to the initial phase stored in the storage unit; and
   a receiving apparatus that receives the signal transmitted from the transmission apparatus.

* * * * *